Figure 1:
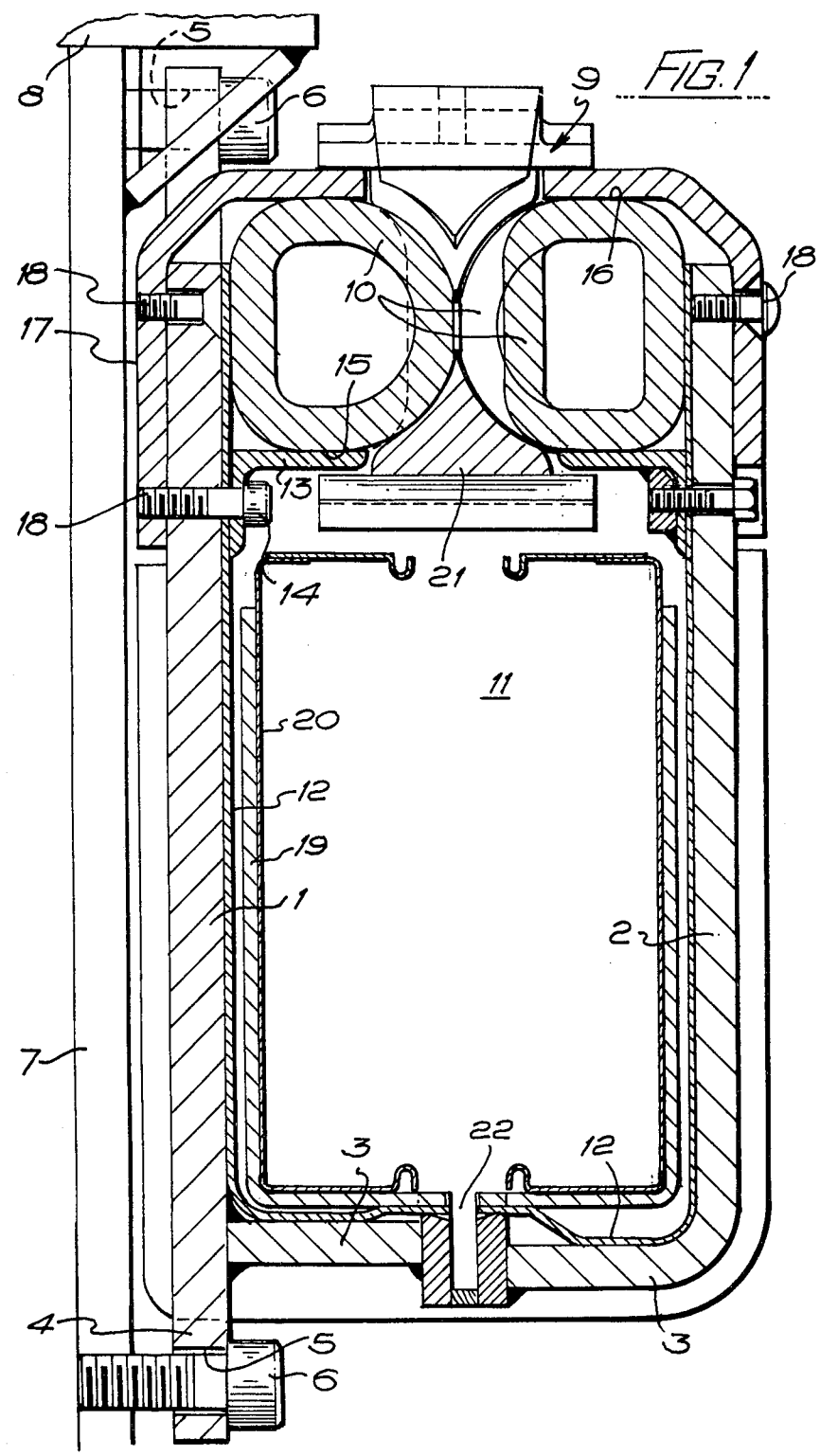

United States Patent [19]

Pentith

[11] 4,245,727
[45] Jan. 20, 1981

[54] CONDUIT

[75] Inventor: Gerald R. O. Pentith, Hoyland Nether, Nr. Barnsley, England

[73] Assignee: Pitcraft Summit Limited, Sheffield, England

[21] Appl. No.: 20,468

[22] Filed: Mar. 14, 1979

[51] Int. Cl.³ .............................................. B60M 1/34
[52] U.S. Cl. ......................................... 191/25; 191/31
[58] Field of Search .................. 191/25, 30, 31, 22 C; 104/140

[56] References Cited

U.S. PATENT DOCUMENTS

| 434,410 | 8/1890 | Van Depoele | 191/25 |
| 467,699 | 1/1892 | Hutchinson | 191/31 |
| 855,492 | 6/1907 | Alexander | 191/30 |
| 4,067,257 | 1/1978 | Pentith | 191/31 X |
| 4,083,439 | 4/1978 | Chandler | 191/35 |

Primary Examiner—Richard A. Schacher
Attorney, Agent, or Firm—Lowe, King, Price & Becker

[57] ABSTRACT

The invention relates to a conduit length to be joined in use to adjacent ends of similar conduit lengths to form an electrical power supply conduit when housing one or more electrical conductors, for the supply of electrical energy to electrical machines, e.g. a mining machine adjacent the conduit, the conduit length being generally of "U" section and internally lined with a seal of flexible material having a corresponding "U" shaped cross section, upper ends of the "U" arms of the conduit each carrying rigid locating means each housing an elongate displaceable sealing means, the two sealing means abutting one another so as to normally close an elongate aperture of the conduit length.

13 Claims, 2 Drawing Figures

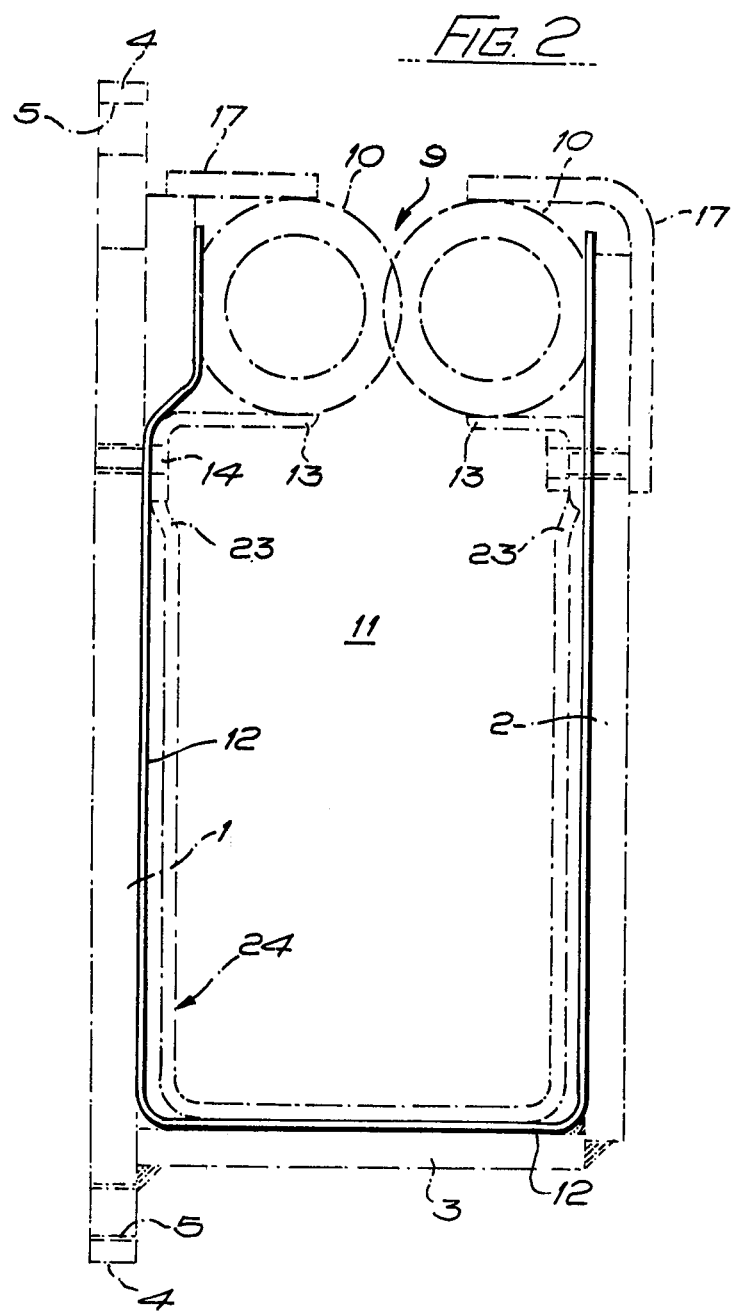

CONDUIT

This invention relates to a conduit length to be joined in use to adjacent ends of similar conduit lengths to form an electrical power supply conduit when housing one or more electrical conductors, for the supply of electrical energy to electrical machines adjacent the conduit.

The conduits may be of a pressurized form e.g. as described in British Pat. No. 1 508 786, or may be as described in 1 508 788, or may be as described in 1 508 785. Through an elongate aperture of the conduit may extend an electrical pick-up means of an electrical machine, to gain access to the conductor.

According to a first aspect of the present invention a conduit length is generally of "U" section and is internally lined with a seal of flexible material having a corresponding "U" shaped cross section, upper ends of the "U" arms of the conduit each carrying rigid locating means each housing an elongate, displaceable sealing means, the two sealing means abutting one another so as to normally close an elongate aperture of the conduit length.

According to a second aspect of the present invention a conduit made up of a plurality of conduit lengths as defined above, secured end to end, has joints at abutting conduit ends bridged by the seal.

Thus the flexible seal, together with the sealing means normally closing the elongate aperture provides a total yet flexible sealing arrangement for the conduit, to restrain loss of the pressurising medium, if the conduit is pressurised in accordance with British Pat. No. 1 508 786 for example, while simultaneously preventing the ingress of contaminants e.g. dust, debris and/or water, to the interior of the conduit with their adverse effect on the electrical power supply contained within the conduit.

Thus, in use, one limb of the conduit may be secured to a support plate in turn secured to the goaf side of an armoured conveyor extending along a mineral face so that one or more mining machines mounted on and/or guided by the conveyor may take electrical energy from within the conduit.

The flexible seal may be of rubber or synthetic plastics material. The elongate sealing means preferably comprises a pair of abutting, inflatable, displaceable tubes as described in British Pat. No. 1 508 785, adjacent peripheries of the sealing tubes abutting one another so as to close the elongate aperture that otherwise exists at the top of the conduit between the arms. Alternatively, the sealing means may be non-inflatable, resilient tubes or strips e.g. of rubber and my be solid, or substantially so, such that they may be parted by the passage of a pick-up arm extending from an electrical machine to conductors located within the conduit. The rigid locating means may be provided by angle pieces which may comprise two individual angle elements each secured to one "U" arm of the conduit length or alternatively, the angle pieces may be constituted by inturned flanges at the upper ends of the arms of a second generally "U" shaped member fitted inside the conduit. As a further alternative two channel section members may be provided. each secured by their base to one "U" arm of the conduit length. The securing of the locating means, of whatever form, may be by bolts. Preferably, the seal interposed between the locating means and the limbs of the conduit length so as to be gripped between these two elements.

The rigid locating means located within the conduit length and spaced from the upper ends of the limbs thereof constitute a shelf on which lower surfaces of sealing tubes may be located, for the upper surfaces of the sealing tubes to be constrained by a removable capping strip secured by bolts to the "U" arms of the conduit. Such a construction gives the advantage during assembly, servicing and repair, that the capping strips and sealing tubes may be readily removed to provide full access to the interior of the conduit.

The base of the conduit may be apertured at intervals for insertion of a gasket mounted bolt to secure e.g. the second generally "U" shaped member or a mounting bracket of a bus-bar housing within the conduit.

Adjacent ends of the conduit may be joined by an articulated joint.

The invention will now be further described, by way of examples, with reference to the accompanying drawings, in which:

FIG. 1 is a transverse sectional view through a first embodiment of conduit length in accordance with the invention; and FIG. 2 is a similar view through a less detailed second embodiment of conduit length in accordance with the invention.

In both embodiments like reference numerals will be used for like parts.

The conduit length is generally of "U" section comprising upstanding parallel side walls 1 and 2, and a horizontal base 3 of length corresponding to that of a standard pan of a scraper chain conveyor e.g. 5 ft. The wall 1 includes an upward and downward extension 4 which is apertured along its length at 5 to receive securing bolts 6, by which the conduit length is secured to a support plate 7, which for example may be intended to be attached (by bolts or by welding) to a side wall (not shown) of a conveyor pan of a scraper chain conveyor. Thus the upper end of the support plate 7 is indicated as carrying a rack bar 8 for a mining machine haulage system of the kind described in British Patent Specification No. 1 352 543.

The upper end of the conduit remote from the base 3 has an elongate apperture, indicated generally at 9, which is normally closed by a pair of inflated, abutting, displaceable sealing tubes 10. The interior 11 of the conduit length is lined with a flexible rubber seal 12 shaped to conform to the inner profile of the conduit length.

In the embodiment of FIG. 1, the conduit length is provided with a rigid locating means associated with the tubes 10, which locating means is constituted by two individual angle elements 13 secured by bolts 14 to the walls 1, 2, with a portion of the seal 12 interposed. Thus, the elements 13 constitute a shelf on which lower surface 15 of the tubes may be located, while upper surfaces 16 of the tubes are constrained by removably capping strips 17, secured by bolts or screws 18.

Within the conduit interior defined by the seal 12 there is provided a mounting bracket 19 generally of "U" shape, carrying a bus-bar 20, access to which bus-bar, e.g. for the pantographs of a mining machine travelling on the associated conveyor, being provided by the tubes 10 being parted by a travelling wedge 21 carried by the mining machine, as detailed in the British patent applications previously referred to, preferably with the interior of the conduit length pressurized with fresh, clean air. The mounting bracket 19 is secured to the conduit length by a plurality of spaced, gasket mounted bolts 22.

In the embodiment of FIG. 2 the angle pieces 13 are constituted by inturned flanges at upper ends 23 of a second generally "U" shaped member 24 fitted inside the conduit, which member is adapted to carry the bus-bars.

What I claim is:

1. A conduit length generally of "U" shape cross-section and having an elongate access slot, said conduit length being internally lined with a seal of flexible material having a corresponding "U" shaped cross-section, "U" arms of said conduit having upper ends, locating means carried by each of said upper ends, and an elongate, displaceable sealing means housed in each said locating means, said two sealing means abutting one another so as to normally close said elongated aperture, upper ends of the "U" arms of the seal being trapped between portions of the sealing means and the rigid locating means.

2. A conduit length as claimed in claim 1, wherein a support plate carries one limb of said conduit, one side of an armoured conveyor extending along a mineral face carrying said support plate.

3. A conduit length as claimed in claim 1, wherein said flexible seal is of rubber.

4. A conduit length as claimed in claim 1, wherein said flexible seal is of synthetic plastics material.

5. A conduit length as claimed in claim 1, wherein said two elongate sealing means comprise a pair of abutting, displaceable, inflatable tubes.

6. A conduit length as claimed in claim 1, wherein said two elongate sealing means comprise resilient strips.

7. A conduit length as claimed in claim 1, wherein angle pieces form part of said rigid locating means.

8. A conduit length as claimed in claim 7, wherein each of said angle pieces comprises two individual angle elements each secured to one "U" arm of said conduit length.

9. A conduit length as claimed in claim 7, comprising a second member having a generally "U" shaped cross-section fitted inside said conduit, inturned flanges at upper ends of arms of said second member constituting said angle pieces.

10. A conduit length as claimed in claim 1, wherein two channel section members, secured by their bases to one "U" arm of the conduit length provide said rigid locating means.

11. A conduit length as claimed in claim 1, wherein said seal is interposed between said locating means and limbs of said conduit length so as to be gripped between these two elements.

12. A conduit length as claimed in claim 5, wherein a removable capping strip secured to the "U" arms of the conduit serves to constrain upper surfaces of said sealing tubes.

13. A conduit length as claimed in claim 1, wherein said conduit is provided with a base which is apertured at intervals for insertion therethrough of gasket mounted bolts.

* * * * *